(12) United States Patent
Sellner et al.

(10) Patent No.: US 9,272,626 B2
(45) Date of Patent: Mar. 1, 2016

(54) DEVICES AND METHODS FOR THE SAFE DRIVING, CHARGING AND ENERGY RECOVERY OPERATION OF AN ELECTRIC VEHICLE

(75) Inventors: Harald Sellner, Gruenberg (DE); Winfried Moell, Laubach (DE); Matthias Oehler, Fronhausen (DE); Wolfgang Hofheinz, Gruenberg (DE)

(73) Assignee: BENDER GMBH & CO. KG, Gruenberg (DE)

( * ) Notice: Subject to any disclaimer, the term of this patent is extended or adjusted under 35 U.S.C. 154(b) by 928 days.

(21) Appl. No.: 13/432,265

(22) Filed: Mar. 28, 2012

(65) Prior Publication Data

US 2012/0249070 A1 Oct. 4, 2012
US 2013/0162207 A9 Jun. 27, 2013

(30) Foreign Application Priority Data

Mar. 30, 2011 (DE) .................. 20 2011 004 515 U
Oct. 12, 2011 (DE) ..................... 10 2011 084 362

(51) Int. Cl.
*B60L 3/00* (2006.01)
*B60L 11/18* (2006.01)
*B60L 3/04* (2006.01)
(Continued)

(52) U.S. Cl.
CPC .............. *B60L 3/0069* (2013.01); *B60L 3/04* (2013.01); *B60L 11/1809* (2013.01); *B60L 11/1816* (2013.01); *B60L 11/1842* (2013.01); *H02H 3/05* (2013.01); *H02H 3/26* (2013.01); *H02H 3/33* (2013.01); *H02J 7/0029* (2013.01); *B60L 2230/12* (2013.01); *B60L 2250/10* (2013.01); *Y02E 60/721* (2013.01); *Y02T 10/7005* (2013.01); *Y02T 10/92* (2013.01); *Y02T 90/121* (2013.01); *Y02T 90/128* (2013.01);
(Continued)

(58) Field of Classification Search
CPC ...... B60L 3/0069; B60L 11/1842; B60L 3/04; B60L 11/1809; B60L 11/1816; H02H 3/33; H02H 3/05; H02H 3/26; H02J 7/00; H02J 7/0029; H01H 9/02
See application file for complete search history.

(56) References Cited

U.S. PATENT DOCUMENTS 5,670,861 A * 9/1997 Nor .............................. 320/118
6,392,422 B1 * 5/2002 Kammer et al. ............. 324/650
(Continued)

FOREIGN PATENT DOCUMENTS

DE         19523534 A1    6/1995
DE      102004057694 A1   6/2006
(Continued)

OTHER PUBLICATIONS

Search Report issued in corresponding German application 20 2011 004 515.3 on Jan. 26, 2012 (no translation available).
(Continued)

*Primary Examiner* — Zeev V Kitov
(74) *Attorney, Agent, or Firm* — Griffin & Szipl, P.C.

(57) ABSTRACT

The invention relates to a method and an electrical protection and monitoring device with an insulation monitoring instrument and a differential current monitoring instrument in an electric vehicle for safe driving operation and also for safe charging and energy recovery operation of the electric vehicle at a charging station. The invention further relates to a device for the safe charging and energy recovery operation of an electric vehicle at a charging station with electrical protection and monitoring devices.

26 Claims, 3 Drawing Sheets

(51) Int. Cl.
*H02H 3/33* (2006.01)
*H02J 7/00* (2006.01)
*H02H 3/05* (2006.01)
*H02H 3/26* (2006.01)

(52) U.S. Cl.
CPC ............... *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 8,106,667 B2 * | 1/2012 | Kawamura et al. | 324/551 |
| 2005/0264264 A1 | 12/2005 | Yano et al. | |
| 2006/0220610 A1 * | 10/2006 | Solberg | 320/105 |
| 2009/0103341 A1 | 4/2009 | Lee et al. | |
| 2009/0278547 A1 * | 11/2009 | Acena | G01R 31/025 324/509 |
| 2010/0033140 A1 | 2/2010 | Otake | |
| 2010/0194354 A1 | 8/2010 | Gotou et al. | |
| 2010/0244850 A1 * | 9/2010 | Yano et al. | 324/510 |
| 2012/0140371 A1 * | 6/2012 | Gaul et al. | 361/93.6 |
| 2012/0143423 A1 * | 6/2012 | Theisen et al. | 701/22 |

FOREIGN PATENT DOCUMENTS

| | | | | |
|---|---|---|---|---|
| DE | 10 2010 014 417 | * | 8/2010 | ............. B60L 11/18 |
| DE | 102009001962 A1 | | 10/2010 | |
| DE | 10 2009 034887 A1 | | 2/2011 | |
| WO | 95/34824 A1 | | 12/1995 | |
| WO | 2006035959 A1 | | 4/2006 | |
| WO | 2010/049775 A2 | | 5/2010 | |
| WO | 2010106059 A1 | | 9/2010 | |
| WO | 2011/008782 A1 | | 1/2011 | |

OTHER PUBLICATIONS

Norm DIN IEC 61851-1 (VDE 0122-1); Dec. 2008, 6 pages.
German Office Action in parallel German Case No. 10 2011 084 362, completed Jan. 31, 2014 and mailed Feb. 5, 2014.
Electric Vehicles (EV), http://www.bender-emobility.com/en/electric-vehicles-ev.html (downloaded Jul. 14, 2015, 4:19 PM).
European Patent Office Search Report relating to parallel application EP12158520. Completed Jun. 17, 2015 and mailed Jun. 24, 2015.

* cited by examiner

DEVICES AND METHODS FOR THE SAFE DRIVING, CHARGING AND ENERGY RECOVERY OPERATION OF AN ELECTRIC VEHICLE

This application claims priority from German Utility Application No. DE 20 2011 004 515.3, filed Mar. 30, 2011, and German Patent Application No. DE 10 2011 084 362.0, filed Oct. 12, 2011, the entire disclosures of which are incorporated herein by reference.

FIELD OF THE INVENTION

The present invention relates to an electrical protection and monitoring device with an insulation monitoring instrument in an electric vehicle for safe driving operation and also for safe charging and energy recovery operation of the electric vehicle at a charging station.

Furthermore, the invention relates to a method for the safe driving operation of an electric vehicle with an electrical protection and monitoring device and also for the safe charging and energy recovery operation of the electric vehicle at a charging station, wherein insulation monitoring takes place during the driving operation to monitor the insulation resistance between the active conductors of the on-board electrical system and the vehicle chassis.

The invention further relates to a device for the safe charging and energy recovery operation of an electric vehicle at a charging station with electrical protection and monitoring devices.

BACKGROUND OF THE INVENTION

As developments in electromobility have advanced, electrical safety considerations have also increasingly come to the fore. These relate on the one hand to the electrical risk potential emanating straight from the vehicle's own energy supply system. In electrical vehicles of the future, this on-board electrical system is usually designed as an insulated DC voltage system (high-voltage system) that supplies energy to the high-voltage consumers. Insulation faults can lead to system damage and cause high contact voltages that endanger individuals. On the other hand, since the electric vehicle's electrical energy stores are regularly charged, the risks occurring during the charging process of the electrical energy stores at a charging station must also be taken into account. In this case, a charging station may be located in the domestic environment or it may be a public charging station. Consequently, the network configurations of the power supply systems feeding the charging station and the resulting charging operating modes are also different. Hence, starting from earthed and unearthed power supply systems, different operating modes exist, such as single-phase and three-phase charging with AC or DC charging currents of different intensities. In addition, there are plans for charging stations that make it possible for energy to be recovered from the electric vehicle's mobile energy store into the stationary power supply network.

The combination of different power supply network configurations and the DC voltage network in the electric vehicle produce various requirements in relation to the electrical safety of the overall charging station/vehicle system. These safety challenges have hitherto been met by means of individual measures that are each separately implemented in the electric vehicle and in the charging station. Insulation monitoring and residual current devices are therefore adequately known and established for stationary power supply networks. Likewise, insulation monitoring instruments for hybrid vehicles have also be proposed that monitor the insulation level of their high-voltage systems.

Problems arise particularly when the electric vehicle is connected to the charging station for charging or recovery operation. As a result of the electrical connection between the electric vehicle and the charging point, a comprehensive earthed network with AC and DC voltage components results from the previously unearthed (IT) network of the electric vehicle in conjunction with a stationary, earthed (TN) current network. This shared network is usually monitored by a type A residual current device (RCD) fitted in the charging station that detects residual alternating currents and residual pulsating direct currents and is only allowed for pure residual direct currents up to maximum 6 mA, as higher residual direct currents can lead to functional impairment. When test currents are supplied by the vehicle's insulation monitoring instrument, (residual) direct currents may however occur that exceed the standard limit of 6 mA for a maximum permitted residual direct current and can therefore interfere with the function of the residual current device at the charging end. In the case of "unknown" electrical outlets, there is also uncertainty as to whether there is a residual current device in the electrical installation or whether the appropriate protection is guaranteed in the event of residual direct currents.

One disadvantage of the known protective measures that has therefore emerged is that they do not take full account of the special features of the respective network configurations and do not therefore exhaust the potential for comprehensive electrical protection against electric shock, particularly during the charging and recovery operation of the electric vehicle at a charging station.

SUMMARY OF THE INVENTION

The present invention therefore addresses the problem of further developing existing electrical protection and monitoring devices with regard to safe operation, particularly safe charging and recovery operation of the electric vehicle at a charging station, and in addition creating a universally suitable device with electrical protection and monitoring mechanisms for electric vehicles that achieves a comprehensive protection concept and thereby satisfies the largest possible number of operating modes, including energy recovery.

This problem is solved by the present invention, having the features according to a first embodiment, in that the electrical protection and monitoring device in the electric vehicle exhibits a differential current monitoring instrument. More specifically, in accordance with the first embodiment of the present invention, an electrical protection and monitoring device is provided in an electric vehicle (6) for safe driving operation and also for safe charging and energy recovery operation of the electric vehicle (6) at a charging station (4), the electrical protection and monitoring device comprising an insulation monitoring instrument (36); and characterised by a differential current monitoring instrument (38) in the electric vehicle (6).

In accordance with a second embodiment, the first embodiment is modified so the insulation monitoring instrument (36) and the differential current monitoring instrument (38) are integrated in a structural unit as a combined monitoring instrument (41). In accordance with a third embodiment, the first embodiment and the second embodiment are modified so the combined monitoring instrument (41) has at least one communication interface (48) with which switching equipment (50) present in the electric vehicle (6) can be actuated. In accordance with a fourth embodiment, the third embodiment is modified so the communication interface (48) is designed as a PWM output, a relay output, an open-collector output or a bus interface.

In accordance with a fifth embodiment, the first embodiment, the second embodiment, the third embodiment and the fourth embodiment are modified so there is a switch mechanism (50) to disconnect the on-board electrical system (52) from the charging station (4). In accordance with a sixth embodiment, the first embodiment, the second embodiment, the third embodiment, the fourth embodiment, and the fifth embodiment are modified so the differential current monitoring instrument (38) is designed for the universal-current-sensitive detection of residual currents. In accordance with a seventh embodiment, the first embodiment, the second embodiment, the third embodiment, the fourth embodiment, the fifth embodiment, and the sixth embodiment are modified to include a circuit designed to detect higher-frequency residual currents. In accordance with an eighth embodiment, the second embodiment, the third embodiment, the fourth embodiment, the fifth embodiment, the sixth embodiment, and the seventh embodiment are modified so the combined monitoring instrument (41) has a self-monitoring unit.

In accordance with a ninth method, a method is provided for the safe driving operation of an electric vehicle (6) with an electrical protection and monitoring device and also for the safe charging and energy recovery operation of the electric vehicle at a charging station (4), wherein insulation monitoring (36) takes place during the driving operation to monitor the insulation resistance between the active conductors of the on-board electrical system (52) and the vehicle chassis, characterised in that when the electric vehicle is connected to the charging station combined monitoring (41) consisting of insulation monitoring (36) and differential current monitoring (38) takes place, this being carried out in the electric vehicle (6) with the entire charging system comprising the electric vehicle (6), charging station (4) and charging cable (18) being monitored, and the differential current monitoring (38) is deactivated in drive mode In accordance with a tenth method, the ninth method is modified so when the electric vehicle (6) is connected to the charging station (4) the insulation monitoring (36) determines an insulation resistance for the vehicle (6) before the charging station (4) is switched on, the charging/recovery process is only cleared if there is adequate insulation resistance, following clearance of the charging/recovery process, the insulation monitoring instrument (36) in the electric vehicle (6) is switched off, the differential current monitoring (38) during the charging/recovery operation monitors a residual current in the charging system, and if a given residual current value is exceeded, the electric vehicle (6) is disconnected from the charging station (4).

In accordance with an eleventh method, the tenth method is modified so the residual current is detected as a differential current or as a protective conductor current. In accordance with a twelfth method, the ninth method, the tenth method and the eleventh method are modified so the differential current monitoring (38) is universal-current-sensitive. In accordance with a thirteenth method, the ninth method, the tenth method, the eleventh method, and the twelfth method are modified so a warning signal is issued if the value falls below a response value for the insulation resistance. In accordance with a fourteenth method, the ninth method, the tenth method, the eleventh method, the twelfth method, and the thirteenth method are modified so an entry is made in a fault memory of the vehicle (6) if the value falls below a response value for the insulation resistance.

In accordance with a fifteenth method, the ninth method, the tenth method, the eleventh method, the twelfth method, the thirteenth method, and the fourteenth method are modified so the insulation monitoring (36) and differential current monitoring (38) issue driver information and generate disconnection signals in case of a fault. In accordance with a sixteenth method, the ninth method, the tenth method, the eleventh method, the twelfth method, the thirteenth method, the fourteenth method, and the fifteenth method are modified so the insulation monitoring (36) and differential current monitoring (38) conduct self-monitoring.

In accordance with a seventeenth embodiment of the present invention, a device is provided for the safe charging and energy recovery operation of an electric vehicle (6) at a charging station (4) with electrical protection and monitoring devices, wherein the electrical protection and monitoring devices are disposed in the electric vehicle (6) as a vehicle-based device and in the charging station (4) and/or charging cable (18) as charging station-based devices. In accordance with an eighteenth embodiment of the present invention, the seventeenth embodiment is modified so the vehicle-based electrical protection and monitoring device is designed according to the first embodiment, the second embodiment, the third embodiment, the fourth embodiment, the fifth embodiment, the sixth embodiment, the seventh embodiment and the eighth embodiment. In accordance with a nineteenth embodiment, the seventeenth embodiment and the eighteenth embodiment are modified so the electrical protection and monitoring mechanisms are designed for different operating modes, including energy recovery.

In accordance with a twentieth embodiment, the seventeenth embodiment, the eighteenth embodiment, and the nineteenth embodiment are modified so the charging station-based protection mechanisms have an insulation monitoring instrument (16). In accordance with a twenty-first embodiment, the seventeenth embodiment, the eighteenth embodiment, the nineteenth embodiment, and the twentieth embodiment are modified so the charging station-based protection mechanisms have a differential current monitoring instrument (12). In accordance with a twenty-second embodiment, the seventeenth embodiment, the eighteenth embodiment, the nineteenth embodiment, the twentieth embodiment, and the twenty-first embodiment are modified so the charging station-based protection mechanisms have an electronically controlled, reconnectable protection switch (14).

In accordance with a twenty-third embodiment, the seventeenth embodiment, the eighteenth embodiment, the nineteenth embodiment, the twentieth embodiment, the twenty-first embodiment and the twenty-second embodiment are modified so the charging station-based protection mechanisms exhibit a switch-on relay (19). In accordance with a twenty-fourth embodiment, the seventeenth embodiment, the eighteenth embodiment, the nineteenth embodiment, the twentieth embodiment, the twenty-first embodiment, the twenty-second embodiment, and the twenty-third embodiment are modified so a voltage and frequency monitoring instrument (20) to monitor the power to be fed back into a stationary power supply network (8). In accordance with a twenty-fifth embodiment, the nineteenth embodiment, the twentieth embodiment, the twenty-first embodiment, the twenty-second embodiment, the twenty-third embodiment, and the twenty-fourth embodiment are modified so the components of the electrical protection and monitoring devices are installed in a control mechanism, which is integrated into a line connection (18) between the charging station (4) and the electric vehicle (6). In accordance with a twenty-sixth embodiment, the nineteenth embodiment, the twentieth embodiment, the twenty-first embodiment, the twenty-second embodiment, the twenty-third embodiment, the twenty-fourth embodiment, and the twenty-fifth embodiment are modified so the insulation monitoring (16, 36), the differential current monitoring (12, 38) and the voltage/frequency monitoring (20) are integrated in a structural unit.

The advantage of the differential current monitoring instrument disposed in the electric vehicle is that the residual current monitoring of the entire charging system, in other words the earthed overall power network created when the electric vehicle is connected to the charging station, is carried out by the vehicle's own differential current monitoring instrument. This may occur independently of the residual current device (type A) normally installed in the charging station. The differential current monitoring instrument in the electric vehicle is also suitable for interrupting the charging process if residual currents occur when the electric vehicle is connected to an "unknown" electrical outlet.

The insulation monitoring instrument and the differential current monitoring instrument are advantageously integrated in a structural unit as a combined monitoring instrument. Integration as a combined monitoring instrument makes it possible for both protection mechanisms for insulation monitoring and differential current monitoring to be coordinated with one another both functionally and in terms of circuitry, thereby guaranteeing safe charging and recovery operation of the electric vehicle.

The combined monitoring instrument preferably has at least one communication interface with which switching equipment present in the electric vehicle can be actuated. Apart from the connection to the vehicle's on-board electrical supply, this communication interface also enables the connection of sensors and actuators, as well as the integration of the combined monitoring instrument in the assembly of control instruments linked to bus systems. To this end, the communication interface is designed as a PWM (pulse width modulation) output, a relay output, an open-collector output or a bus interface.

In order to disconnect the vehicle from the power supply network if a given residual current value is exceeded, the electrical protection and monitoring device has a vehicle-based switch mechanism to disconnect the on-board electrical system from the charging station. This switch mechanism can also be used to control the charging/recovery process.

In a further practical embodiment, the differential current monitoring instrument is designed for the universal-current-sensitive detection of residual currents (type B), so that in addition to residual alternating currents and residual pulsating direct currents, pure residual direct currents can also be detected. In this case, the circuit is designed in such a manner that higher-frequency residual alternating currents in the 20 kHz range are also detected.

High operational safety is guaranteed in that the combined monitoring instrument has a self-monitoring unit that permanently checks the instrument function.

In relation to the method, the problem is solved by the present invention, according to a ninth method, in that when the electric vehicle is connected to the charging station combined monitoring consisting of insulation monitoring and differential current monitoring takes place, this being carried out in the electric vehicle with the entire charging system comprising the electric vehicle, charging station and charging cable being monitored, and the differential current monitoring is deactivated in drive mode.

The monitoring according to the invention of the entire charging system by the electric vehicle's electrical protection and monitoring device facilitates a safe charging and energy recovery operation from "unknown" electrical outlets, particularly electrical outlets that do not have a residual current device.

In an advantageous embodiment of the method, when the electric vehicle is connected to the charging station the insulation monitoring detects an insulation resistance for the vehicle before the charging station is switched on, whereupon the charging/recovery process is only cleared if there is adequate insulation resistance. Following clearance of the charging/recovery process, the insulation monitoring instrument in the electric vehicle is switched off, whereupon the differential current monitoring during the charging/recovery operation monitors the residual current in the charging system and if a given residual current value is exceeded, the electric vehicle is disconnected from the charging station. In order to preclude a possible hazard before the charging/recovery process begins, the insulation monitoring instrument disposed in the electric vehicle first checks the vehicle's insulation resistance and only clears the charging/recovery process by switching on the power supply network if there is adequate insulation resistance. The resulting comprehensive TN network is then monitored for possible residual currents when the insulation monitoring instrument is switched off during the charging/recovery operation by the electric vehicle's differential current monitoring instrument. If in the event of a fault the residual current exceeds a given, predetermined residual current value, the vehicle is automatically disconnected from the power supply.

Depending on the configuration of a measuring current transformer connected to the differential current monitoring instrument, the residual current may be advantageously detected as a differential current or as a protective conductor current, in which case the differential current monitoring is universal-current-sensitive. Furthermore, the differential alternating current may be monitored during energy recovery operation.

In conjunction with the insulation resistance monitoring before the charging/recovery process begins, a warning signal is preferably issued if the value falls below a response value for the insulation resistance. If this fault occurs, an entry may also be made in a vehicle's fault memory.

The configuration of the insulation monitoring and differential current monitoring with a communication interface advantageously enables driver information to be issued and disconnection signals generated in case of a fault to control the charging/recovery process.

Operational safety is guaranteed by permanent self-monitoring of the insulation monitoring and differential current monitoring.

The invention also relates to a seventeenth embodiment of the present invention, in that the electrical protection and monitoring devices are disposed in the electric vehicle as a vehicle-based device and in the charging station and/or charging cable as charging station-based devices.

The device according to the invention comprises a combination of protection mechanisms guaranteeing the vehicle's electrical safety and protection mechanisms guaranteeing the electrical safety of the charging station. The combination according to the invention of the protection mechanisms disposed in the electric vehicle (vehicle-based) and the protection mechanisms disposed in the charging station and in the charging cable (charging station-based) to create a comprehensive electrical safety system according to the invention makes it possible to utilise their interaction more effectively to achieve improved electrical safety to protect against electric shock and also to build into the safety considerations the recovery of energy from the electric vehicle into the stationary power supply network.

In an advantageous manner, the vehicle-based electrical protection and monitoring device is designed according to the first embodiment, the second embodiment, the third embodiment, the fourth embodiment, the fifth embodiment, the sixth embodiment, the seventh embodiment, and the eighth embodiment. This means that during charging and energy recovery operation, the advantages mentioned above for the vehicle-based electrical protection and monitoring device result in a comprehensive safety concept for the entire charging system too. In particular, a differential current monitoring instrument installed in the electric vehicle combined with the universal-current-sensitive detection of residual currents improves safety during charging and energy recovery operation.

The configuration of the electrical protection and monitoring devices in the overall charging system comprising the electric vehicle, charging station and charging cable for different standard charging modes and for energy recovery, results in universal applicability of the device.

The charging station-based protection mechanisms preferably have an insulation monitoring instrument. During a charging process, this insulation monitoring instrument may assume the function of the vehicle-based insulation monitoring instrument and check the entire connected system, comprising the charging station, charging cable and electric vehicle, for insulation resistance before the charging current is switched on. When the electric vehicle is docked, the function of the vehicle's own insulation monitoring instrument may be assumed by a charging station-based protection mechanism of the same kind through the integrated structure of the device according to the invention.

Furthermore, the charging station-based protection mechanisms advantageously comprise a differential current monitoring instrument. This differential current monitoring instrument checks the differential current at the charging station end and initiates switch-off of the charging station, as soon as the differential current exceeds a previously defined response value.

In a further advantageous embodiment, the device at the charging station end exhibits an electronically controlled, reconnectable protection switch that is able to override the connection between the charging station and the stationary power supply network. The protective switch is triggered in the event of an overload or if an excessively high differential current recognised by the charging station-based differential current measuring instrument is detected. Insofar as there is no higher priority fault, a reconnection may advantageously take place following successful clearance by the insulation monitoring instrument. Reconnection is particularly significant when the vehicle's insulation level is close to the limit and the switch may be tripped during a charging cycle.

Furthermore, the charging station-based protection mechanisms exhibit a switch-on relay that performs the actual switch-on of the charging station to the electric vehicle and, in the case of energy recovery, breaks the connection between the charging station and the electric vehicle if a deviation in the supply voltage or supply frequency is detected.

It is advantageous for the device to exhibit a voltage and frequency monitoring instrument to monitor the power to be fed back into a stationary power supply network. This appliance checks observance of defined limit values for the determining parameters of the energy flow being recovered. If these limit values are exceeded, the recovery is interrupted and the vehicle disconnected from the charging station.

In a further advantageous embodiment, functions of the vehicle-based protection instruments and the charging station-based protection instruments and also the monitoring devices are installed in a control mechanism that is integrated into a line connection between the charging station and the electric vehicle. The aforementioned protective functions of the device according to the invention may therefore be realised in significant parts in a compact structural unit that can be accommodated by the charging cable. It is also provided in this case that protection mechanisms with the same function, e.g. the vehicle-based and charging station-based differential current monitoring instrument are combined in one instrument.

BRIEF DESCRIPTION OF THE DRAWINGS

Further advantageous design features emerge from the following description and drawings that explain the preferred embodiments of the invention with the help of examples. In these.

DETAILED DESCRIPTION OF THE INVENTION

Figure 1:
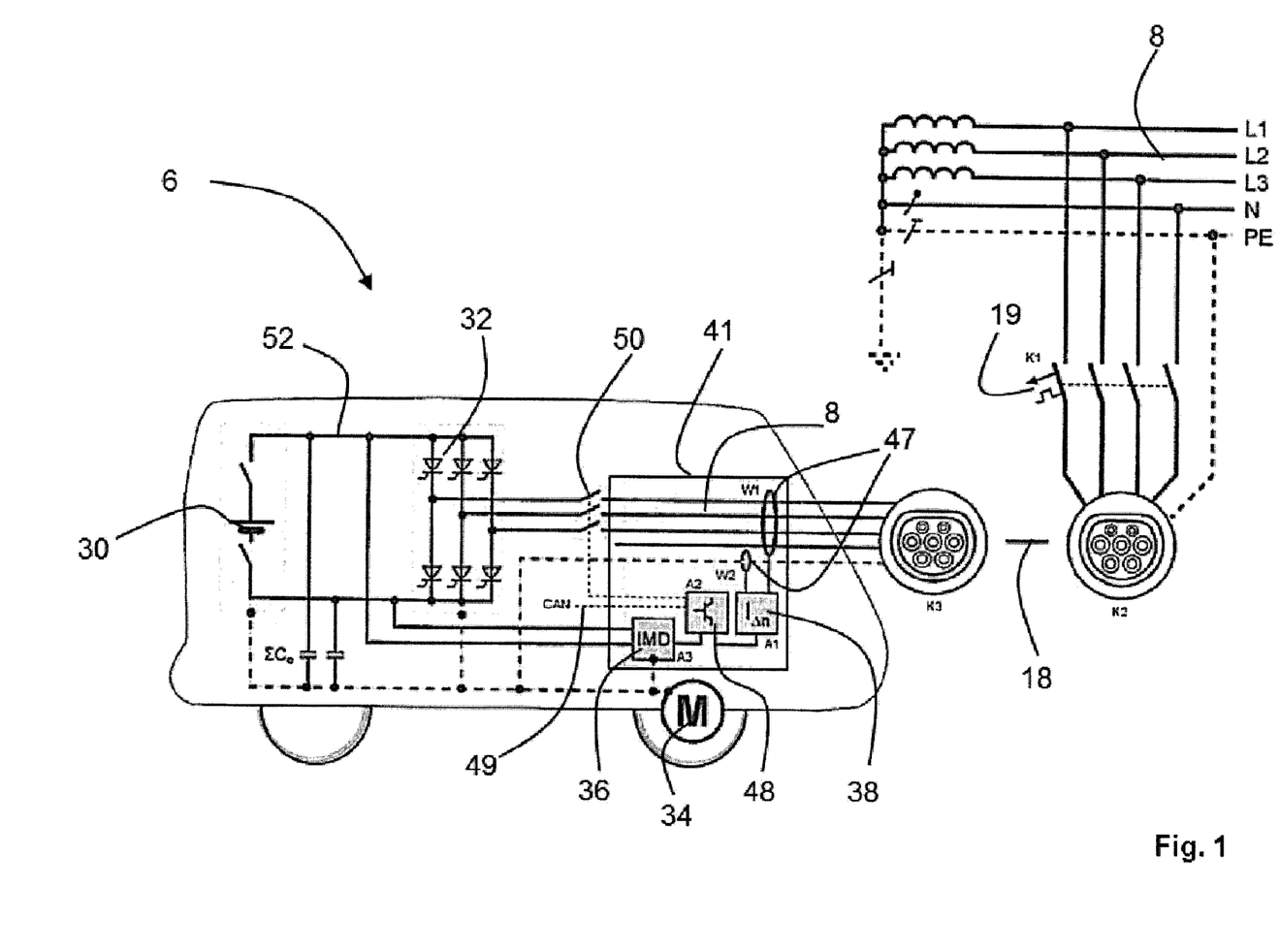
FIG. 1 shows a functional block diagram of an electrical protection and monitoring device according to the invention in an electric vehicle.

FIG. 1 shows a functional block diagram of an electrical protection and monitoring device according to the invention in an electric vehicle 6.

The electric vehicle 6 exhibits as its main electrical drive components a rechargeable energy store 30, an electric motor 34 and a converter 32 to actuate this. An insulation monitoring instrument 36 and a differential current monitoring instrument 38 are depicted as the protection and monitoring device.

In drive mode, the insulation monitoring instrument 36 detects possible insulation faults in the on-board electrical system of the electric vehicle 6 by measuring the insulation resistance and in the event of a fault it initiates an entry in a fault memory and/or issues a warning signal perceptible to the driver, in the form of an acoustic or optical signal, for example. If the electric vehicle is on a power supply network 8 or at a special charging station 4 (FIG. 3) during the charging/recovery operation, the insulation monitoring instrument 36 measures the insulation resistance of the entire charging system, including the electric vehicle 6 and a charging cable 18 (FIG. 3) before switching on the power supply network 8. If a permitted, adequately large value is determined for the insulation resistance, e.g. 1 MOhm, charging is cleared. Once the power supply network 8 or else the charging station 4 has been switched on, the insulation monitoring instrument 16 is switched off and set at high impedance (>1 MOhm to earth).

The insulation monitoring instrument 36 and the differential current monitoring instrument 38 are integrated in a structural unit as a combined monitoring instrument 41. Measuring current transformers 47 used to detect residual currents on the coupled power supply line 8 are connected to the combined monitoring instrument 41; for measuring insulation resistance, the combined monitoring instrument 41 is connected to the on-board electrical system 52. Furthermore, the combined monitoring instrument 41 exhibits a communication interface 48 with an outlet to activate the vehicle's own switching mechanism 50. By means of this switching mechanism 50, the on-board energy system can be disconnected from the charging station 4, particularly in the event of a fault when a maximum permitted residual current is exceeded. A further possibility for disconnecting the power supply network 8 is provided by a cut-off relay 19 at the network end that is triggered from the combined monitoring instrument 41 via a control line conducted in the charging cable 18. As a further output, the communication interface 48 of the combined monitoring instrument 41 has a CAN bus interface for linking up to a vehicle bus system 49.

Figure 2:
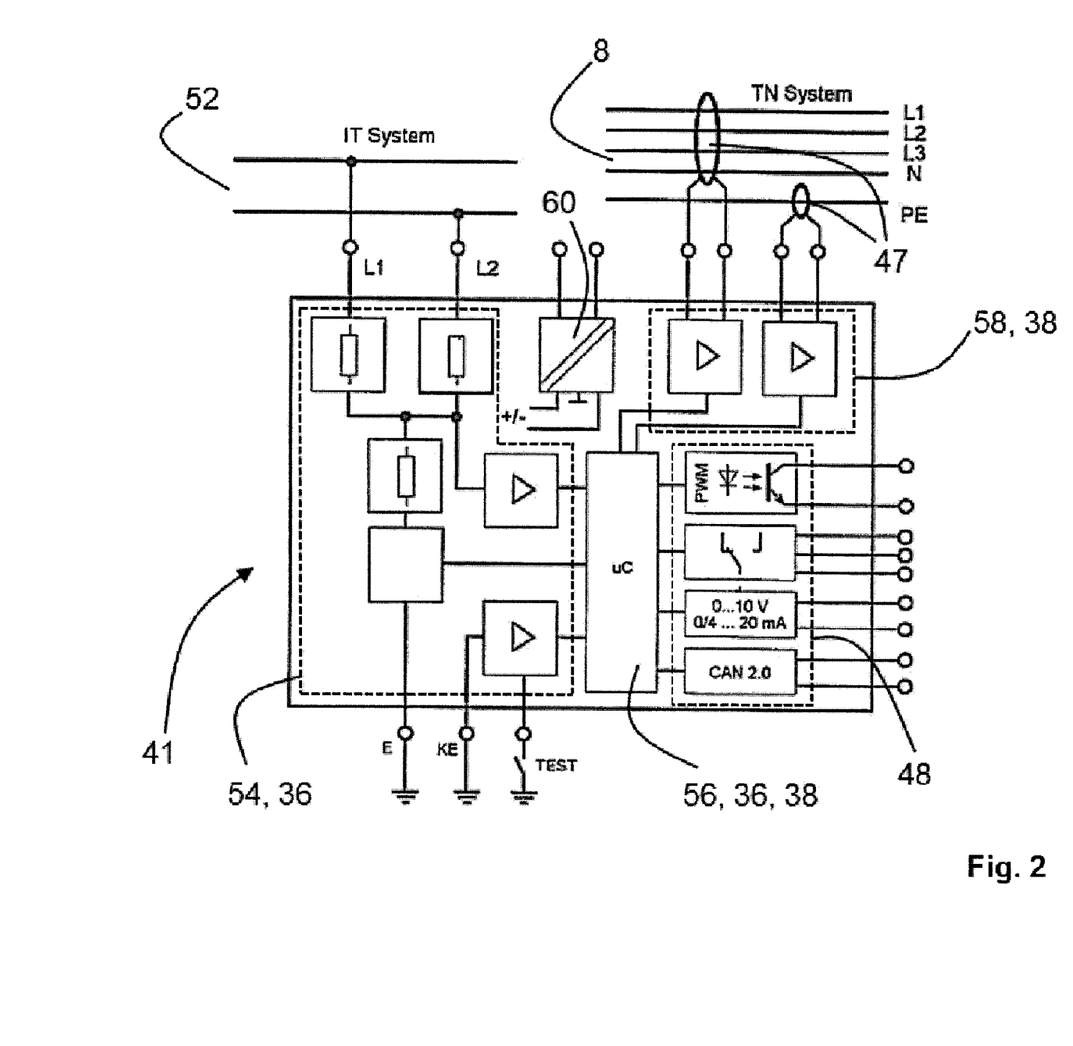
FIG. 2 shows a functional block diagram of a combined monitoring instrument.

FIG. 2 shows a functional block diagram of the combined monitoring instrument 41. The combined monitoring instrument 41 is connected to the vehicle's own IT network (on-board energy system) 52 to measure the insulation resistance and to the external power supply network 8 to detect residual currents. The insulation resistance is measured using the integrated insulation monitoring instrument 36 that consists of a coupling and measuring network with a test current generator and amplifier circuits 54 and also a microprocessor 56. Residual currents are detected using the integrated differential current monitoring instrument 38 that likewise comprises the microprocessor 56 and detects possible residual currents in the connected section of the power supply network 8 via the measuring current transformer 47 with amplifier circuits 58, separated for conductors L1, L2, L3, N, on the one hand, and for the earth connection PE, on the other.

The communication interface 48 of the combined monitoring instrument 41 has a PWM output, a relay output, an open collector output and a CAN bus interface. The combined monitoring instrument 41 is provided with a mains adapter 60 for its own power supply.

Figure 3:
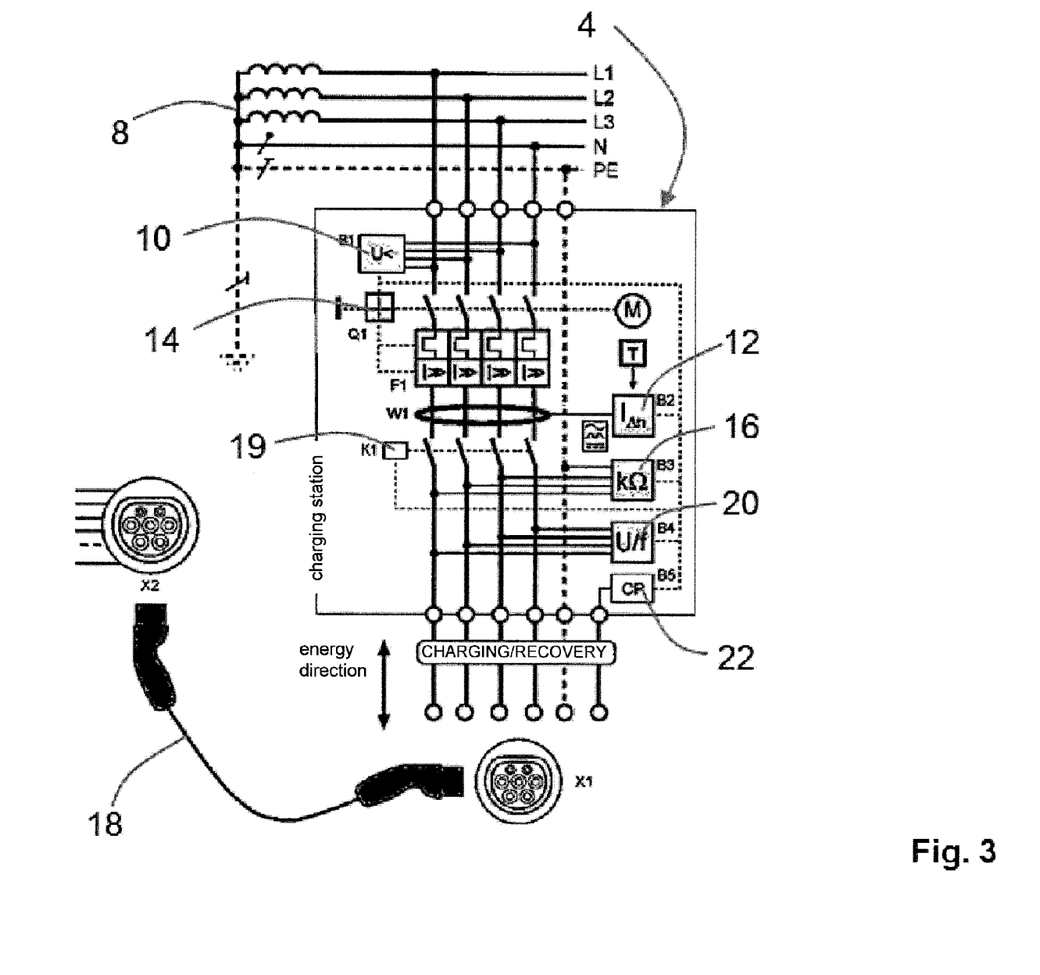
FIG. 3 shows a functional block diagram of the charging station-based protection mechanisms.

FIG. 3 shows a functional block diagram of the charging station-based protection and monitoring devices. The bidirectional charging station 4 for electric vehicles 6 is fed via the earthed 3-phase power supply network 8, the voltage of which is checked using a monitoring circuit 10 in the charging station 4. A differential current monitoring instrument 12 in the charging station 4 detects a differential current in the event of a fault and brings about a disconnection of the charging station 4 from the power supply network 8 by means of an electronically controlled, reconnectable protection switch 14.

As an alternative to the insulation monitoring instrument 36 (FIG. 1) in the electric vehicle 6 (FIG. 1), an insulation monitoring instrument 16 in the loading station 4 may test the insulation resistance of the charging system of an electric vehicle 6 connected to the loading station 4 before the power supply network 8 is connected.

A switch-on relay 19 performs the switching-on of the charging station 4 and removes the connection in the case of energy recovery if it detects a non-permissible deviation in the supply voltage or supply frequency. In the case of energy recovery from the electric vehicle 6 via the charging station 4 into the stationary power supply network 8, the observance of defined limit values for the voltage and frequency of the energy recovered is checked by a voltage and frequency monitoring instrument 20. It is thereby ensured that the AC voltage being applied is supplied in accordance with the requirements of the power supply network 8. As an additional regulatory standard, the charging station 4 comprises a signal control device 22, via which the control and monitoring data affecting the charging process are exchanged between the charging station 4 and the electric vehicle 6.

The invention claimed is:

1. An electrical protection and monitoring device in an electric vehicle for safe driving operation and also for safe charging of a rechargeable energy store of the electric vehicle with an unearthed IT network as an on-board electrical system and energy recovery operation from the energy store of the electric vehicle at a charging station, the electrical protection and monitoring device comprising:
   (a) an insulation monitoring instrument connected to the on-board electrical system of the electric vehicle; and
   (b) a differential current monitoring instrument in the electric vehicle connected to a connected section of the power supply network to monitor a residual current.

2. The electrical protection and monitoring device according to claim 1, wherein the insulation monitoring instrument and the differential current monitoring instrument are integrated in a structural unit as a combined monitoring instrument.

3. The electrical protection and monitoring device according to claim 2, wherein the combined monitoring instrument includes at least one communication interface that can actuate switching equipment present in the electric vehicle.

4. The electrical protection and monitoring device according to claim 3, wherein the communication interface is designed as a PWM output, a relay output, an open-collector output or a bus interface.

5. The electrical protection and monitoring device according to claim 1, further comprising
   (c) a switch mechanism to disconnect the on-board electrical system from a charging station.

6. The electrical protection and monitoring device according to claim 1, wherein the differential current monitoring instrument is designed for universal-current-sensitive detection of residual currents.

7. The electrical protection and monitoring device according to claim 1, further comprising
   (c) a circuit designed to detect higher-frequency residual currents.

8. The electrical protection and monitoring device according to claim 2, wherein the combined monitoring instrument includes a self-monitoring unit.

9. A method for the safe driving operation of an electric vehicle with an unearthed IT network as an on-board electrical system and an electrical protection and monitoring device and also for the safe charging of a rechargeable energy store of the electric vehicle as an on-board electrical system and energy recovery operation from the energy store of the electric vehicle at a charging station, the method comprising the steps of:
   (a) monitoring an insulation resistance between at least one active conductors of an on-board electrical system and a vehicle chassis with an insulation monitoring instrument during the driving operation;
   (b) monitoring the insulation resistance before starting charging, and monitoring the differential current in the electric vehicle when the electric vehicle is connected to the charging station,
      wherein an entire charging system comprises the electric vehicle, the charging station and a charging cable being monitored; and
   (c) deactivating the differential current monitoring instrument while in drive mode.

10. The method according to claim 9,
   wherein, when the electric vehicle is connected to the charging station, the method comprising the additional steps of:
   (i) connecting the electric vehicle to the charging station;
   (ii) monitoring the insulation with an insulation monitoring instrument determine an insulation resistance for the electric vehicle before the charging station is switched on;
   (iii) clearing a charging/recovery process if insulation resistance is adequate, (iv) switching off the insulation monitoring instrument following clearance of the charging/recovery process;

(v) monitoring a residual current in the charging system with a differential current monitoring instrument during the charging/recovery operation; and (v) disconnecting the electric vehicle from the charging station if a given residual current value is exceeded.

11. The method according to claim 10, wherein the residual current is detected as a differential current or as a protective conductor current.

12. The method according to claim 9, wherein the differential current monitoring instrument is universal-current-sensitive.

13. The method according to claim 9, wherein a warning signal is issued if the value falls below a response value for the insulation resistance.

14. The method according to claim 9, wherein an entry is made in a fault memory of the electric vehicle if the value falls below a response value for the insulation resistance.

15. The method according to claim 9, wherein the insulation monitoring instrument and differential current monitoring instrument issue information to the driver and generate disconnection signals in case of a fault.

16. The method according to claim 9, wherein the insulation monitoring instrument and differential current monitoring instrument conduct self-monitoring.

17. A device for the safe charging of a rechargeable energy store of an electric vehicle with an unearthed IT network as an on-board electrical system and energy recovery operation from the energy store of the electric vehicle at a charging station, the device comprising:

an electrical protection device and an electrical monitoring device operably connected to protect against electrical shocks creating a comprehensive electrical safety system, wherein the electrical protection device and the electrical monitoring device are disposed in the electric vehicle as a vehicle-based electrical protection and monitoring device and in the charging station, or a charging cable, or the charging station and the charging cable, as charging station-based electrical protection and monitoring devices.

18. The device according to claim 17, wherein the vehicle-based electrical protection and monitoring device comprises
(a) an insulation monitoring instrument connected to the on-board electrical system of the electric vehicle; and
(b) a differential current monitoring instrument in the electric vehicle connected to a connected section of the power supply network to monitor a residual current.

19. The device according to claim 17, wherein the electrical protection and monitoring devices are designed for different operating modes, including energy recovery.

20. The device according claim 17, wherein the charging station-based protection devices include an insulation monitoring instrument.

21. The device according to claim 17, wherein the charging station-based electrical protection and monitoring devices include a differential current monitoring instrument.

22. The device according to claim 17, wherein the charging station-based electrical protection and monitoring devices include an electronically controlled, reconnectable protection switch.

23. The device according to claim 17, wherein the charging station-based electrical protection and monitoring devices exhibit a switch-on relay.

24. The device according to claim 18, further comprising
a voltage and frequency monitoring instrument, wherein the voltage and frequency monitoring instrument monitors the power to be fed back into a stationary power supply network.

25. The device according to claim 17, wherein a plurality of components of the electrical protection and monitoring devices are installed in a control mechanism, which is integrated into a line connection between the charging station and the electric vehicle.

26. The device according to claim 24, wherein the insulation monitoring instrument, the differential current monitoring instrument and the voltage and frequency monitoring instrument are integrated in a structural unit.

* * * * *